United States Patent [19]

Combs-Rose et al.

[11] Patent Number: 4,858,990
[45] Date of Patent: Aug. 22, 1989

[54] SUN VISOR FOR INFANT CAR SEATS

[76] Inventors: Kimberly Combs-Rose; Carl Rose, both of Rt. #5, Box 523, Berea, Ky. 40403

[21] Appl. No.: 210,800

[22] Filed: Jun. 24, 1988

[51] Int. Cl.[4] ............................................. A47C 7/62
[52] U.S. Cl. ................................... 297/184; 248/279; 403/391; 135/96; 84/94.2
[58] Field of Search ............... 297/184; 248/230, 278, 248/279, 284, 286, 231.6, 316.6, 449.2, 539; 403/389, 391, 399; 135/96, 16; 84/94.2, 95.2; 5/108, 109, 508

[56] References Cited

U.S. PATENT DOCUMENTS

| | | | |
|---|---|---|---|
| 392,588 | 11/1888 | Cone | 248/230 |
| 460,207 | 9/1891 | Lazarus | 297/184 |
| 900,572 | 10/1908 | Morton | 297/184 |
| 1,383,771 | 7/1921 | Skidmore | 297/184 |
| 1,416,386 | 5/1922 | Selah | 248/230 |
| 1,449,255 | 3/1923 | Abrahams et al. | 297/184 |
| 2,769,988 | 11/1956 | Bukolt | 84/94.2 |
| 2,784,028 | 3/1957 | Swider et al. | 248/286 |
| 4,027,915 | 6/1977 | Anderson et al. | |
| 4,050,342 | 9/1977 | Suzuki et al. | 84/94.2 |
| 4,293,162 | 10/1981 | Pap et al. | 135/96 |
| 4,314,727 | 2/1982 | Potts | |
| 4,579,385 | 4/1986 | Koenig | |
| 4,583,779 | 4/1986 | Myers | |
| 4,583,780 | 4/1986 | Finn | |
| 4,735,388 | 4/1988 | Marks | 248/278 |

FOREIGN PATENT DOCUMENTS 470502 8/1937 United Kingdom ............... 248/278

Primary Examiner—Kenneth J. Dorner
Assistant Examiner—Brian K. Green
Attorney, Agent, or Firm—Jerry T. Kearns

[57] ABSTRACT

A sun visor for attachment to infant car seats has a semicylindrical hood which is attached to an elongated mounting arm. The mounting arm is provided with a clamp for securement to an upper frame portion of the infant car seat. In a second embodiment, a pivotal auxiliary side visor, a pull down front shade and a pivotally adjustable telescoping mounting arm is provided. A musical toy may be mounted in the visor for amusement of an infant in the car seat.

9 Claims, 5 Drawing Sheets

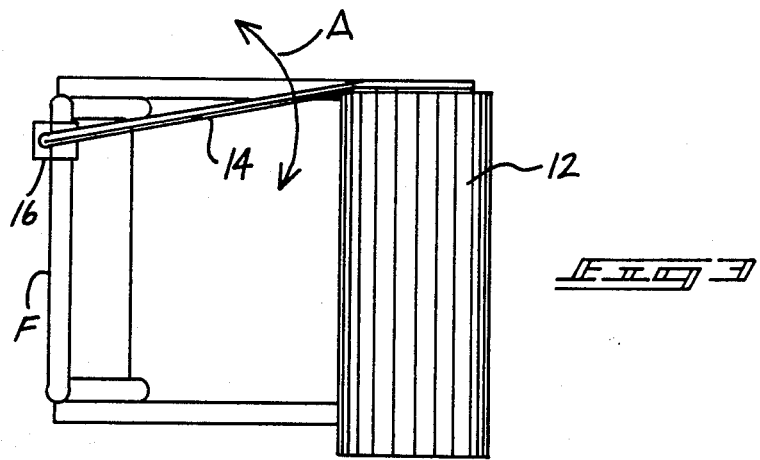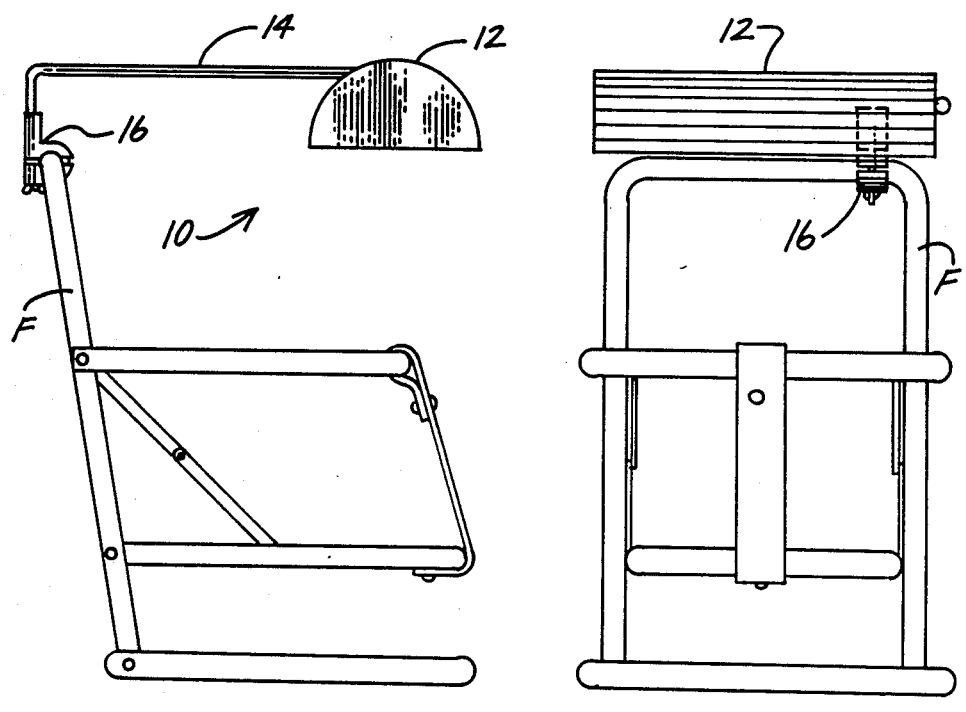

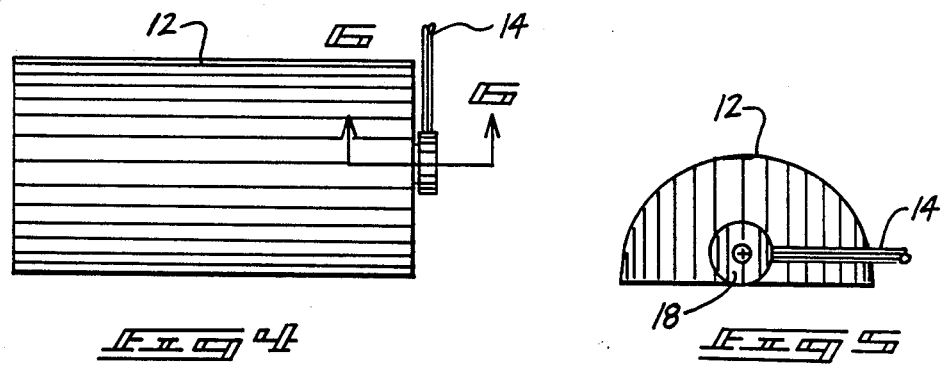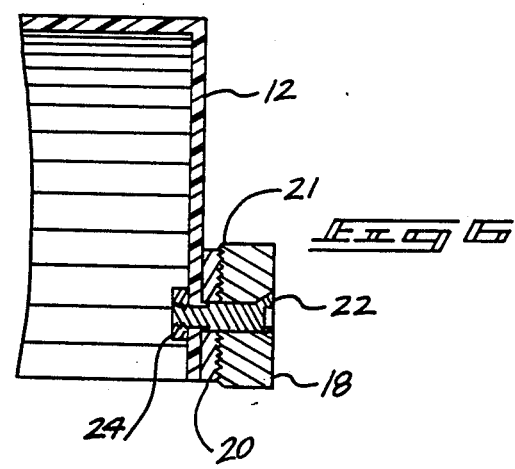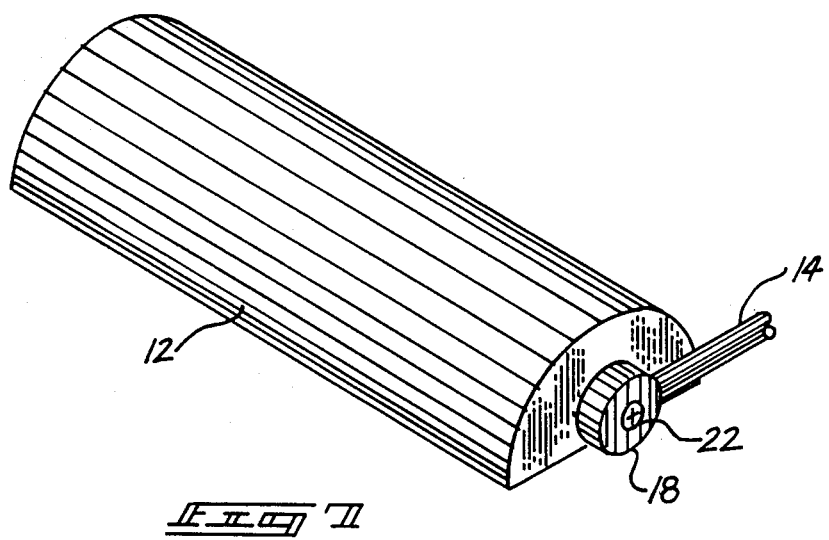

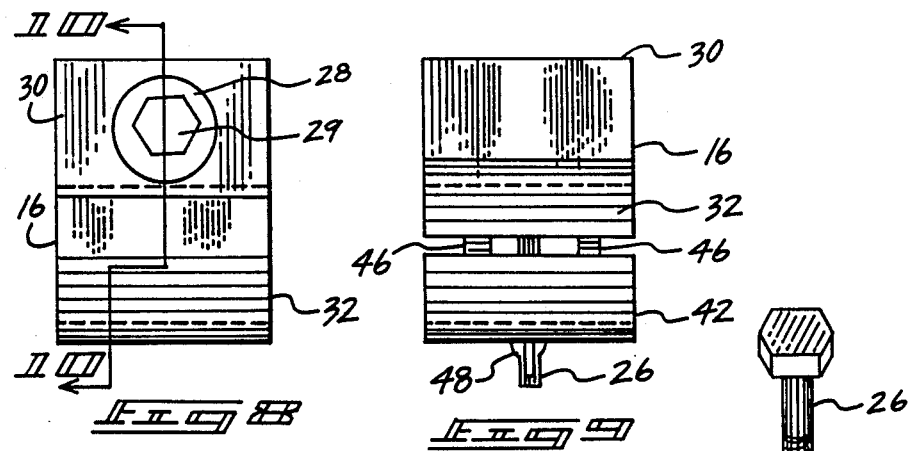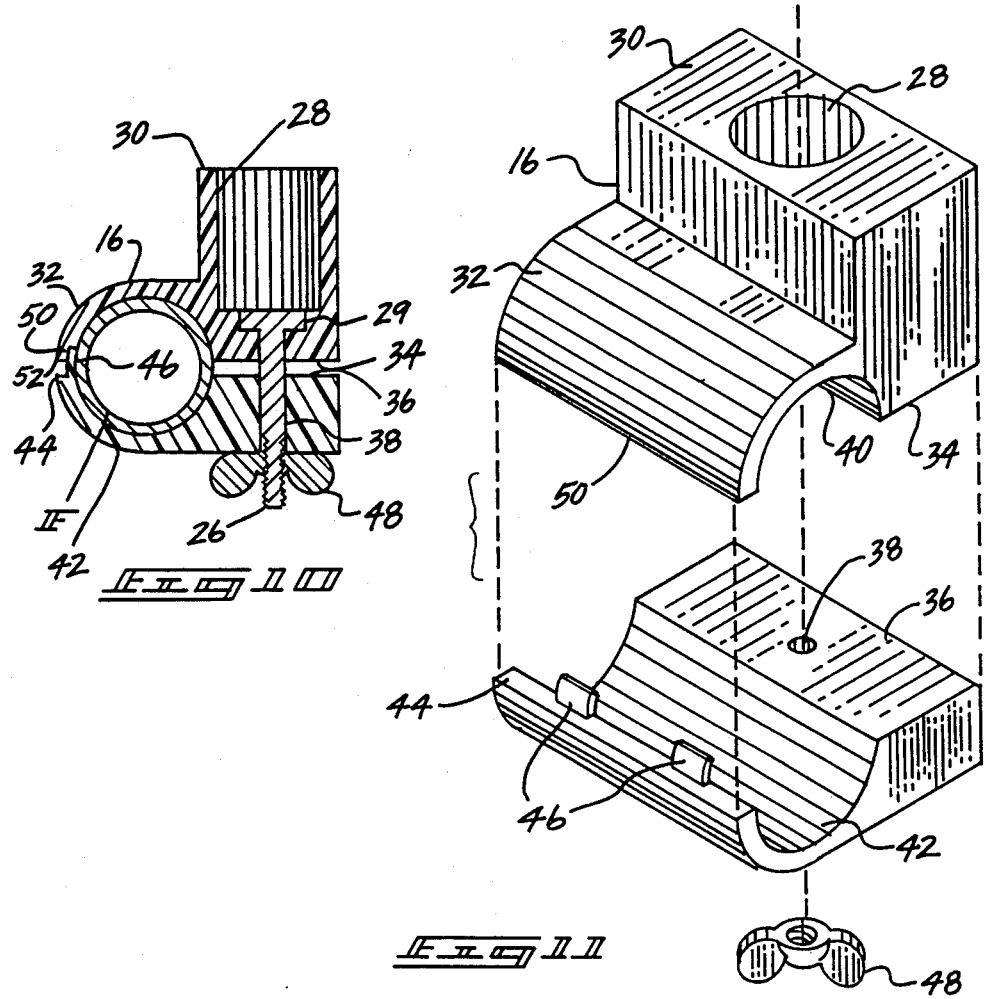

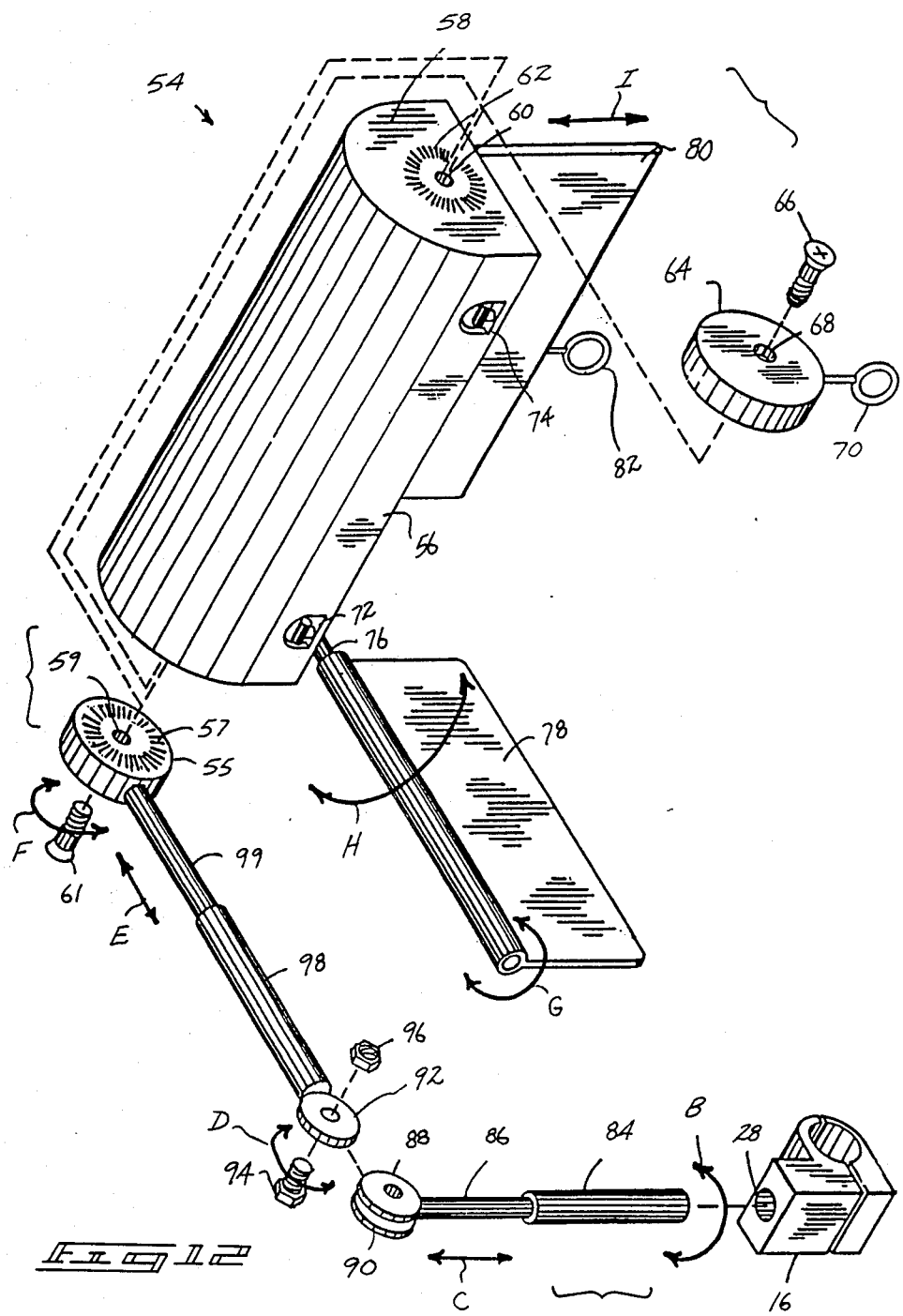

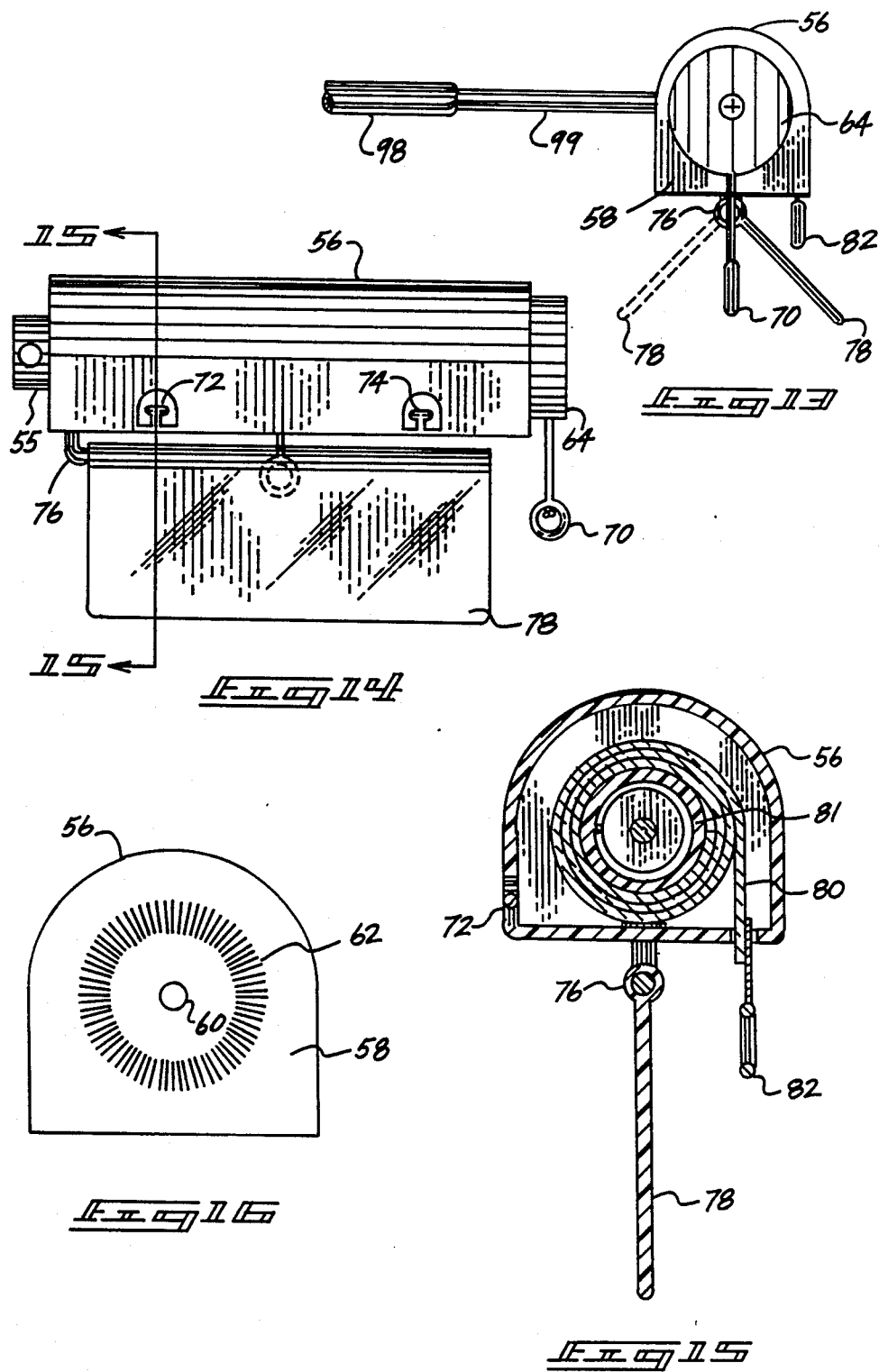

SUN VISOR FOR INFANT CAR SEATS

BACKGROUND OF THE INVENTION

1. Field of the Invention

The present invention relates to sun visors, and more particularly pertains to a sun visor for attachment to infant car seats. The skin of small children and especially infants is extremely sensitive to the damaging ultraviolet rays of the sun. Additionally, the infrared radiation from the sun's rays can make such infants uncomfortable causing them to awaken and cry. In order to provide protection to infants in car seats, the present invention provides a detachable sun visor which may be easily attached to the frame of an infant car seat for shielding an infant from the damaging rays of the sun.

2. Description of the Prior Art

Various types of sun visors are known in the prior art. A typical example of such a sun visor for attachment to an infant car seat is to be found in U.S. Pat. No. 4,027,915, which issued to D. Anderson et al on June 7, 1977. This patent discloses a sun shield assembly for detachable attachment to an infant's car seat which includes a pair of mounting brackets and a hood mountable in the brackets. Each bracket is formed with a base having an adhesive material on one face thereof and a hollow cylindrical boss projecting form the other face of the bracket. The hood is provided with a pair of cylindrical pivot pins which extend from opposed side walls and are dimensioned to pivot within the corresponding boss of the mounting bracket. U.S. Pat. No. 4,314,727, which issued to J. Potts on Feb. 9, 1982, discloses a weather guard for quick-release attachment to a child's car seat to include a transparent shatterproof bubble, having manually activated air vents, moisture collection troughs on all sides, flexible rain diversion spouts, and a padded bottom edge. The guard is attached to the upper half of existing children's car seats by the use of quick-disconnecting snaps, VELCRO fasteners or other devices. U.S. Pat. No. 4,579,385, which issued to C. Koenig on Apr. 1, 1986, discloses a sunshade and protective cushioning device for use with automobile child seats. The device includes a pair of peripherally joined flexible sheets and a valve for permitting pressurization of the airspace between the sheets. The device may be attached between the seatback and front retainer bar of the child seat to substantially cover the occupant. A pair of flaps extend from the sheet to shield the occupant from laterally incident sunlight. U.S. Pat. No. 4,583,779, which issued to P. Myers on Apr. 22, 1986, discloses a sunshade for an infant's car seat which utilizes a flexible sheet like canopy. The canopy extends in a generally horizontal position in use and has a pocket formed at a first end for fitting over the top of the back of an infant's car seat. There is a flexible tension link at a second end of the canopy for stretchably anchoring the canopy to a part of the car's interior. A pair of side flaps extend along opposite sides of the canopy between the ends thereof. U.S. Pat. No. 4,583,780, which issued to C. Finn on Apr. 22, 1986, discloses a sunscreen for attachment to an infant's car seat which utilizes a transparent, tinted flexible plastic sunscreen pivotally attached between mounting clasps. The clasps have handles for easy and rapid replacement or removal of the sunscreen from the child's car seat. The clasps have jaw elements which can be locked into position once the jaws are attached to the edge of the seat. The clasps can be attached in various orientations to position the sunscreen on a variety of different car seats.

While the above mentioned devices are suited for their intended usage, none of these devices provide a semicylindrical visor mounted by a pivotal telescoping mounting arm by a clamp on an upper frame portion of an infant car seat. Additionally, none of the aforesaid devices discloses a sun visor for detachable securement to an infant car seat which utilizes a compound adjustable mounting arm and is provided with adjustable front and side sunscreens. Inasmuch as the art is relatively crowded with respect to these various types of sun visors, it can be appreciated that there is a continuing need for and interest in improvements to such sun visors, and in this respect, the present invention addresses this need and interest.

SUMMARY OF THE INVENTION

In view of the foregoing disadvantages inherent in the known types of sun visors now present in the prior art, the present invention provides an improved sun visor for infant car seats. As such, the general purpose of the present invention, which will be described subsequently in greater detail, is to provide a new and improved sun visor for infant car seats which has all the advantages of the prior art sun visors and none of the disadvantages.

To attain this, representative embodiments of the concepts of the present invention are illustrated in the drawings and make use of a semicylindrical hood which is attached to an elongated mounting arm. The mounting arm is provided with a clamp for securement to an upper frame portion of the infant car seat. In a second embodiment, a pivotal side visor, a pull down front shade and a pivotally adjustable telescoping mounting arm is provided. A musical toy may be mounted in the visor for amusement of an infant in the car seat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sun visor for infant car seats which has all the advantages of the prior art sun visors and none of the disadvantages.

It is another object of the present invention to provide a new and improved sun visor for infant car seats which may be easily and efficiently manufactured and marketed.

It is a further object of the present invention to provide a new and improved sun visor for infant car seats which is of a durable and reliable construction.

An even further object of the present invention is to provide a new and improved sun visor for infant car seats which is susceptible of a low cost of manufacture with regard to both materials and labor, and which accordingly is then susceptible of low prices of sale to the consuming public, thereby making such sun visors economically available to the buying public.

Still yet another object of the present invention is to provide a new and improved sun visor for infant car seats which provides in the apparatuses and methods of the prior art some of the advantages thereof, while simultaneously overcoming some of the disadvantages normally associated therewith.

Still another object of the present invention is to provide a new and improved sun visor for attachment to an infant car seat which is provided with a pivotal, extendable mounting arm.

Yet another object of the present invention is to provide a new and improved sun visor for infant car seats which may be easily adjusted between operative and inoperative positions to allow an infant to be easily removed from the car seat.

Even still another object of the present invention is to provide a new and improved sun visor for infant car seats which utilizes auxilliary adjustable front and side sun visors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the sun visor according to the first embodiment of the present invention mounted on a conventional infant car seat.

FIG. 2 is a front view of the sun visor according to the first embodiment of the present invention.

FIG. 3 is a top view of the sun visor according to the first embodiment of the present invention.

FIG. 4 is a top detail view of the sun visor according to the first embodiment of the present invention, illustrating the semicylindrical hood portion thereof.

FIG. 5 is a side detail view illustrating the attachment of the mounting arm to the semicylindrical hood.

FIG. 6 is a cross sectional view, taken along line 6—6 of FIG. 4, illustrating the connection of the mounting arm to the semicylindrical hood.

FIG. 7 is a perspective view of the semicylindrical hood and a portion of the attached mounting arm.

FIG. 8 is a top view of the clamp for attaching the mounting arm to the frame of a conventional infant car seat.

FIG. 9 is a front view of the clamp.

FIG. 10 is a cross sectional view, taken along line 10—10 of FIG. 8, further illustrating the construction of the clamp.

FIG. 11 is an exploded perspective view of the mounting arm attachment clamp.

FIG. 12 is an exploded perspective view illustrating the sun visor according to a second embodiment of the present invention.

FIG. 13 is a side view of the sun visor according to the second embodiment of the present invention.

FIG. 14 is a back view of the sun visor according to the second embodiment of the present invention.

FIG. 15 is a transverse cross sectional view, taken along line 15—15 of FIG. 14, illustrating the internal construction of the sun visor according to the second embodiment of the present invention.

FIG. 16 is a side view of the semicylindrical hood of the sun visor according to the second embodiment of the present invention.

DESCRIPTION OF THE PREFERRED EMBODIMENT

With reference now to the drawings, and in particular to FIG. 1 thereof, a new and improved sun visor for infant car seats embodying the principles and concepts of the present invention and generally designated by the reference numeral 10 will be described.

More specifically, it will be noted that the first embodiment 10 of the invention includes a hood 12 which is mounted for rotation about a horizontal axis on an elongated mounting arm 14. The mounting arm 14 has a downwardly extending portion received for rotation about a vertical axis in a socket formed in a clamp 16. The clamp 16 secures the mounting arm 14 and attached hood 12 to an upper portion of a frame F of a conventional infant car seat.

As shown in FIG. 2, the hood 12 has an elongated generally semicylindrical configuration. The hood 12 is preferably formed from a shatterproof plastic material so as to avoid any potential injuries to an infant in the event of an accident.

With reference now to the top view provided in FIG. 3, it may be understood that the mounting arm 14 may be pivoted with respect to the clamp 16 along the arc of the arrow A. This allows the hood 12 to be laterally swung out of the way to allow an infant to be removed or replaced within the seat.

In FIG. 4, a top detail view of the hood 12 and mounting arm end portion 14 is provided.

In FIG. 5, a side view illustrates the attachment of the mounting arm end portion 14 to a side wall of the semicylindrical hood 12.

As shown in FIG. 6, the mounting arm 14 is provided with an attached circular mounting boss 18. A circular washer 20 is secured adhesively to the side wall of the hood 12. The washer 20 and boss 18 are provided with mating concentric circular grooves 21 for purposes of frictionally retaining the hood 12 in an adjusted position. The bolt 22 has a conical head which engages in a counter sunk aperture which extends through the boss 18. An opposite end of the bolt 22 has a short threaded portion which is in threaded engagement with a nut 24. The hood 12 and attached washer 20 may be manually rotated about the axis of the bolt 22, but will be maintained in an adjusted position by virtue of the frictional engagement created by the mating grooves 21. The required adjustment force may be regulated by adjustment of the tightness of the nut 24. Thus, the hood 12 may be manually adjusted to any selected position about the horizontal axis of the bolt 22.

FIG. 7 provides a perspective view of the semicylindrical hood 12 and mounting arm end portion 14.

In FIG. 8, a top view of the clamp 16 for attaching the mounting arm 14 to the frame F of an infant car seat is illustrated. The clamp 16 has a rectangular body portion 30 which is provided with a recessed circular socket 28 for receiving the end portion of the arm 14 for free rotation about a vertical axis. A hexagonal recess 29 is formed in a bottom wall of the socket 28 for retaining the head of a threaded fastener.

In FIG. 9, a front view of the clamp 16 is provided. The clamp 16 has mating semicylindrical portions 32 and 42 which are adapted to engage the frame of an infant car seat. Tabs 46 formed on the bottom clamp portion 42 engage an undercut groove formed in the upper clamp portion 32 for maintaining the clamp in an aligned relation around the frame of the infant car seat. A hex head bolt 26 joins the upper 32 and lower 42 clamp portions. The tightness of the clamp portions around the frame of an infant car seat is regulated by manual adjustment of a wing-nut 48.

In FIG. 10, a transverse cross sectional view illustrates the constructional details of the clamp 16. The cylindrical socket 28 is formed in a rectangular body portion 30 integrally formed with the upper clamp portion 32. A hex head bolt 26 is received in a hexagonal recess 29 formed in the bottom of the socket 28. The bolt 26 extends through the upper clamp portion 32 through a circular bore 38 formed through the lower clamp portion 42. A wing-nut 48 is utilized to tighten the semicylindrical upper 32 and lower 42 clamp portions about the frame F of an infant car seat. An elongated undercut groove 52 is formed in a bottom wall 50 of the semicylindrical clamp portion 32 for engagement with tabs 46 provided on an upper surface 44 of the lower clamp portion 42. The upper 32 and lower 42 clamp portions are provided with facing planar surfaces 34 and 36 which extend in parallel spaced relation when the clamp 16 is tightened around the frame F of the car seat.

In FIG. 11, an exploded perspective view further illustrates the details of the construction of the clamp 16.

With reference now to FIG. 12, a sun visor for attachment to infant car seats according to a second embodiment 54 of the present invention will now be described. An elongated generally semicylindrical hood 56 is formed from a somewhat resilient plastic material. Both end faces 58 of the hood 56 are provided with a centrally formed threaded aperture 60. A circular array of short radial grooves 62 is formed coaxially around the aperture 60. A circular boss 55 which is attached to an end portion 99 of an elongated mounting arm is provided with a central circular aperture 59 for reception of a machine screw 61. A circular array of radially extending projections 57 is formed coaxially around the aperture 59 on both end faces of the boss 55. This allows the mounting boss 59 to be attached at either end of the hood 56. The machine screw 61 is tightened within the threaded aperture 60 to an extent necessary to maintain the hood 56 in an adjusted position. Cooperating engagement of the grooves 62 and projections 57 allows the hood 56 to be maintained in a selected adjusted position about the axis of the screw 61, as indicated by arrow F. It should be noted that the boss 55 and the hood 56 is formed from a somewhat resilient plastic material to allow frictional engagement of the grooves 62 with the projections 57. It is also considered within the scope of the present invention to form the grooves 62 on the end faces of the boss 55 and form the projections 57 on the end faces 58 of the hood 56. A clamp 16 which may be of the same type described in detail with reference to FIGS. 8 thorugh 11, is utilized to mount an elongated mounting arm to the frame of a conventional infant car seat. A vertically extending leg portion 84 of the mounting arm is received for free rotation within the socket 28 of the clamp 16, as indicated by arrow B. An extendable segment 86 is telescoped within the base portion 84, and is adjustable for extension or retraction as indicated by arrow C. A yoke is formed at an upper end of the extension 86 by two spaced circular discs 88 and 90. Coxial apertures are formed through each of the discs 88 and 90. A circular flange 92 is provided with a central circular aperture and is adapted to be received between the spaced circular discs 88 and 90. A bolt 94 is utilized to secure the flange 92 for pivotal adjustment between the discs 88 and 90. By tightening the bolt 94 and a nut 96 to an appropriate extent, the upper leg portion 98 of the mounting arm will be frictionally retained in any desired adjusted position. An extension 99 is received within the upper leg portion 98 for selective extension or retraction, as indicated by arrow E. The end of the extension 99 is secured to the boss 55. Thus, the hood 56 is mounted for pivotal adjustment about three different axes and is also mounted for sliding adjustment in two dimensions. This provides a total of five axes of adjustment for the hood 56. This allows the hood 56 to be easily positioned in an appropriate position to shield an infant from the damaging rays of the sun. An auxilliary side visor 78 is mounted for pivotal adjustment about the axis of a mounting rod 76 as indicated by arrow G. The mounting rod 76 is pivotally mounted to a flat bottom surface of the hood 56 for adjustment about an axis orthogonal to the longitudinal axes of the rod 76, as indicated by arrow H. A front sunshade 80 is mounted for extension or retraction as indicated by arrow I on a conventional spring shade roller within the interior of the hood 56. A pull loop 82 is provided for manipulation of the shade 80. A music box 64 may be attached at either end 58 of the hood 56 by a screw 66. The musical device 64 is of the conventional form which is actuated by a pull string 70. This device preferably produces a soothing lullaby for assisting in soothing infants within the car seat. A pair of recessed hooks 72 and 74 are provided for removably securing small toys to the back surface of the hood 56 for providing entertainment to an infant within a car seat.

In FIG. 13, an end view illustrates the musical device 64 secured at one end 58 of the hood 56. The auxilliary visor mounting rod 76 is illustrated pivoted to an adjusted position generally parallel with the flat bottom surface of the hood 56. The shade 78 has a pivotal range of adjustment as illustrated in dotted lines.

In FIG. 14, a back view of the hood 56 is provided.

In FIG. 15, a transverse cross sectional view of the hood 56 illustrates the spring shade mounting roller 81 which serves to retractably support the shade 80 within the hood 56. The hood 80 may be withdrawn through an elongated slot formed in the flat bottom surface of the hood 56 by manipulation of the loop 82.

FIG. 16 provides a detail view of one end 58 of the hood 56. As previously described, both ends 58 of the hood 56 are provided with a central circular aperture 60 surrounded with by a coaxial array of radially extending grooves or projections 62. This allows either end of the hood 56 to be attached to the boss 55 on the mounting arm. Thus, the device may be adapted for use in either left or right hand seats of a vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved sun visor for attachment to an infant car seat, comprising:
   hood means;
   mounting arm means;
   connecting means securing said mounting arm means to said hood means;
   clamp means for securing said mounting arm means to an infant car seat;
   said clamp means including two semicylindrical clamp body portions;
   a recessed cylindrical socket formed in one of said clamp body portions;
   a hexagonal recess formed coaxially within said cylindrical socket;
   a cylindrical bore extending through each of said clamp body portions in axial alignment;
   a hexagonal headed threaded fastener extending between said clamp body portions through said cylindrical bores;
   wing nut in threaded engagement with said fastener for securing said clamp body portions around a frame of an infant car seat;
   a pair of spaced tabs formed on an upper surface of one of said clamp body portions;
   and
   an elongated undercut groove formed in a bottom surface of the other clamp body portion.

2. The sun visor of claim 1, further comprising a retractable front sun shade mounted on said hood means.

3. The sun visor of claim 2, further comprising a spring roller mounting said retractable front sun shade within said hood means.

4. The sun visor of claim 1, further comprising a side visor mounted on said hood means.

5. The sun visor of claim 4, further comprising means mounting said side visor on said hood means for pivotal adjustment about two perpendicular axes.

6. The sun visor of claim 1, wherein said mounting arm means includes means mounting said hood means for three axis adjustment.

7. The sun visor of claim 1, wherein said mounting arm means includes means mounting said hood means for four axis adjustment.

8. The sun visor of claim 1, wherein said mounting arm means includes means mounting said hood means for five axis adjustment.

9. The sun visor of claim 1, further comprising a music device on said hood means.

* * * * *